United States Patent
Monk et al.

(10) Patent No.: US 7,169,452 B1
(45) Date of Patent: *Jan. 30, 2007

(54) PROJECTILE BARRIER AND METHOD

(76) Inventors: Russell Allen Monk, 220 Culver Lane South, Salem, OR (US) 97302; Thomas Stegen Ohnstad, 4668 Independence Drive SE., Salem, OR (US) 97302; James Jackson Milham Henry, 6995 SW. Highland Ct., Wilsonville, OR (US) 97070

( * ) Notice: Subject to any disclaimer, the term of this patent is extended or adjusted under 35 U.S.C. 154(b) by 71 days.

This patent is subject to a terminal disclaimer.

(21) Appl. No.: 11/067,525

(22) Filed: Feb. 25, 2005

Related U.S. Application Data

(60) Provisional application No. 60/629,259, filed on Nov. 19, 2004, provisional application No. 60/623,723, filed on Oct. 28, 2004, provisional application No. 60/621,263, filed on Oct. 20, 2004.

(51) Int. Cl.
*B32B 25/00* (2006.01)
*B32B 25/02* (2006.01)
*B32B 27/24* (2006.01)
*F17C 3/00* (2006.01)

(52) U.S. Cl. .................. 428/35.7; 428/213; 428/411.1; 428/912; 220/560.02; 220/900

(58) Field of Classification Search ............ 428/35.7, 428/213, 411.1, 911, 912; 220/4.14, 560.02; 220/567.2, 900, 562

See application file for complete search history.

(56) References Cited

U.S. PATENT DOCUMENTS

| | | | |
|---|---|---|---|
| 3,509,016 A | 4/1970 | Underwood et al. |
| 3,698,587 A | 10/1972 | Baker et al. |
| 3,801,425 A | 4/1974 | Cook |
| 4,115,616 A | 9/1978 | Heitz et al. |
| 4,216,803 A | 8/1980 | Hall |
| 4,345,698 A | 8/1982 | Villemain |
| 4,352,851 A | 10/1982 | Heitz et al. |
| 4,422,561 A | 12/1983 | Grosvenor et al. |
| 4,728,711 A | 3/1988 | Rosthauser et al. |

*Primary Examiner*—Ramsey Zacharia
(74) *Attorney, Agent, or Firm*—Jon M. Dickinson, PC; Robert D. Varitz, PC

(57) ABSTRACT

Barrier structure placeable as an anti-fuel-leak coating on the outside surface of a liquid container. This coating includes a first-type layer structure formed of a high-elongation-capable elastomer which also is capable of imbibing container leakage liquid, and of swelling in the process, and a second-type layer structure disposed adjacent one side of the first-type layer structure, composite in nature, and possessing bead-like components entrained in the same elastomer employed in first-type layer structure, with these entrained components structured also to be imbibers of leakage container liquid, and to expand on imbibing such liquid. Also disclosed is methodology which involves applying to the outside surface of such a container a coating possessing cooperative, penetration-sealing characteristics including (a) elastic elongatability before breakage within a range of about 300–400%, and (b) leakage-liquid-contact swelling, accompanied by leakage-liquid/coating contact-triggered coagulation.

6 Claims, 2 Drawing Sheets

PROJECTILE BARRIER AND METHOD

CROSS-REFERENCES TO RELATED APPLICATIONS

This patent application claims respective priorities to three U.S. Provisional Patent Applications, now abandoned, the entireties of whose disclosure contents are hereby incorporated herein by reference. These prior-filed applications include: (a) U.S. Provisional Patent Application Ser. No. 60/621,263, filed Oct. 20, 2004, for "Projectile Barrier and Method"; (b) U.S. Provisional Patent Application Ser. No. 60/623,723, filed Oct. 28, 2004, for "Projectile Barrier and Method Including Substance Coagulation"; and (c) U.S. Provisional Patent Application Ser. No. 60/629,259, filed Nov. 19, 2004, for "Differentiated-Thickness Layer-Sandwich Projectile Barrier and Method".

BACKGROUND AND SUMMARY OF THE INVENTION

This invention, which is illustrated and described herein in a military setting wherein it offers special utility (though it is not per se dedicated to military use), relates to a layered jacket barrier structure which may be applied as an outside surface coating to an exposed container, such as the tanker container body in a large hydrocarbon fuel-supply truck, and a vehicle's exposed hydrocarbon fuel tank, to effect quick self-sealing against leakage from a container puncture wound, such as a penetrating bullet wound. We refer to this coating structure as being a barrier structure that disables a container-penetrating projectile, such as a bullet, from producing an uncontrolled liquid leak from the container. It also relates to methodology which is associated with this barrier coating structure.

For illustration purposes only, a preferred embodiment of the coating of the invention is specifically disclosed and illustrated herein in relation to the fuel tank in a smaller-than-tanker military vehicle.

Such a coating can effectively substantially nullify a combat tactic which involves (a) creating a penetrating bullet wound in such a tank/container, (b) thereby producing flammable fuel leakage typically enhanced by the usual positive residual pressure in that tank, (c) and then, using and firing an incendiary projectile, igniting the leaked fuel to attack the associated vehicle by fire.

The layered coating proposed by the present invention, which is also referred to herein as a projectile disabling barrier structure, employs two foundation materials, one of which, by itself, is employed as a singularity to form one type of the two different layer types, or structures, employed according to the invention, and the other of which is combined, as an entrained substance, in and with the first-mentioned foundation material to form the second layer type. The second layer type, which combines the two materials just generally mentioned, performs with behavior that effectively characterizes a de facto third "type" of material—in effect, a composite material.

Several different layered coating structures are illustrated and described herein, with the preferred coating structure being formed, as will shortly be described, as one including three cooperative layers.

According to practice of the invention, and in the mentioned, illustrative setting involving an exposed fuel tank in a military vehicle, the exposed surface of such a tank is appropriately coated/jacketed with a sandwiched, plural-layer, self-healing/self-sealing barrier structure which implements several important, cooperative mechanisms for mending a bullet-puncture fuel leak.

One of these mechanisms features significant elasticity furnished by elastic stretch and recovery of a very high-elastic-stretch-capable (about 400% elongation before breakage) elastomer. The elastomer employed to implement this mechanism is also a modest "reaction-time" substance which responds, in the setting now being described, to fuel contact with modest hydrocarbon fuel-imbibing and swelling actions. The term "modest" will be characterized herein shortly.

Another mechanism employs a layer-embedded pellet, or bead-like, fuel-imbiber material (also called a "reaction" substance) which responds aggressively and quickly to contact with the usual hydrocarbon fuel to undergo a rapid absorption (imbibing) of any leaking fuel, accompanied by a rapid, three-dimensional, physical, synergistic, swollen-volume enlargement (about 300%) because of such absorption. The term "synergistic" is used herein because of the fact that the swollen bead volume which develops as just mentioned appears to be greater than the sum of the individual volumes of the interacting fuel and the reaction-substance bead-like material.

Still a further mechanism involves the use per se of the mentioned bead-like material, which further responds to contact with hydrocarbon fuel in a manner which results in a congealing reaction occurring between absorbed fuel and the imbibing bead material. This congealing reaction can be likened to coagulation, with respect to which there results a tacky, thickened mass of material that tends to coalesce so as to form a very tenacious barrier continuum which contributes significantly to the blockage of outward flow and leakage of fuel from a tank.

Yet another mechanism at work in the sealing operation of the invention comes about because of tension which exists in an outer elastomeric material layer that forms part of the invention. This tension leads to enhanced compression of leakage-contact-swollen layer material in the vicinity of a container puncture wound.

The consequences of the above-mentioned mechanism actions and behaviors are that a leakage passage which results from a bullet (projectile) strike which penetrates the proposed layer-like barrier structure (a) is rapidly substantially fully closed almost immediately by the mentioned elastomer mechanism, (b) is additionally compression-sealed quickly by fuel-imbibing-produced material swelling and expansion resulting from material contact with leakage fuel, and (c) is further closed off by the coagulation/congealing action just mentioned.

These and other important mechanisms and features, soon to be more fully described, are provided by a unique, multi-layer jacket which includes, fundamentally, the above-mentioned, several, different, individual and composite materials which work in cooperation with one another in accordance with the invention. Among these other mechanisms and features are (a) that initial tension is built into the outer layer of a plural-layer structure fabricated in accordance with the invention, and (b), that the different layers preferably, though not necessarily, and as initially created, increase in thickness progressing outwardly through the layer structure from the surface of a protected fuel (or other) tank.

All of the features and operating mechanisms of the invention will be more fully understood and appreciated as the description which now follows is read in conjunction with the accompanying drawings.

DESCRIPTION OF THE DRAWINGS

In FIG. 4, certain cross-sectional shading has been omitted for the sake of visual clarity.

DETAILED DESCRIPTION OF THE INVENTION

Figure 1:
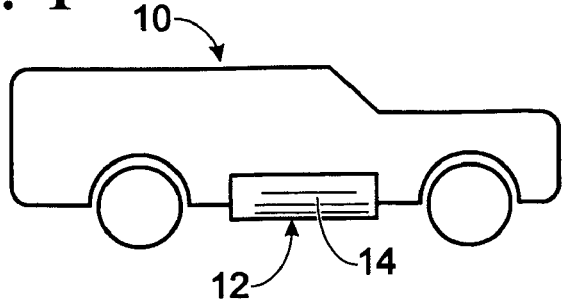
FIG. 1 is a simplified, small scale, side new of a military vehicle having an exposed fuel tank, the outer surface of which has been treated with a preferred embodiment of the layered barrier coating of the present invention.

Turning attention now to the drawings, and referring first of all to FIGS. 1–4, inclusive, shown generally at 10 in FIG. 1 is a military vehicle which possesses a laterally disposed, exposed steel fuel tank, or container, 12. This tank is covered, at least on its laterally exposed outside surface expanse, by a plural-layer barrier sandwich coating structure 14 which has been constructed in accordance with the present invention. Tank 12 contains liquid hydrocarbon fuel (not specifically shown) which is typically under a certain small amount of pressure (say about 4–5-psi) which is above normal atmospheric pressure. This elevated pressure, which of course exacerbates fuel leakage in the event of a tank puncture, exists for several well-known reasons, one of which, as an illustration, involves normal fuel vapor pressure.

It should be understood that the word "container" as employed herein is not confined to meaning only a vehicle's fuel tank. It may also apply, as examples, to a conduit, to a fuel-supply tanker, to holding tanks, to rail tanker cars, and to other kinds of liquid containers.

Figure 2:
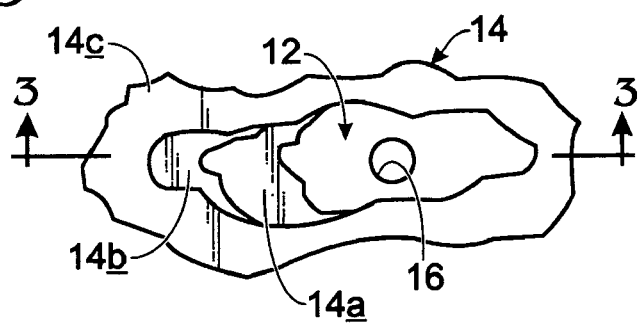
FIG. 2 provides an enlarged, fragmentary, detail view of a portion of the outside of the fuel tank shown in the vehicle of FIG. 1. In particular, it illustrates a situation where a bullet has punctured this tank. Portions of the structure shown in this figure have been broken away for illustrative purposes.
Figure 3:
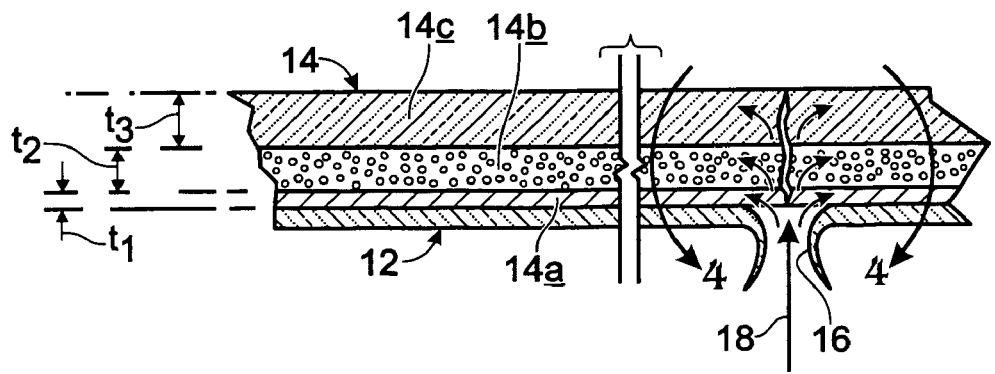
FIG. 3 illustrates, fragmentarily, and on a larger scale than that which is employed in FIG. 2, a cross-sectional view taken generally along the line 3—3 in FIG. 2.
Figure 4:
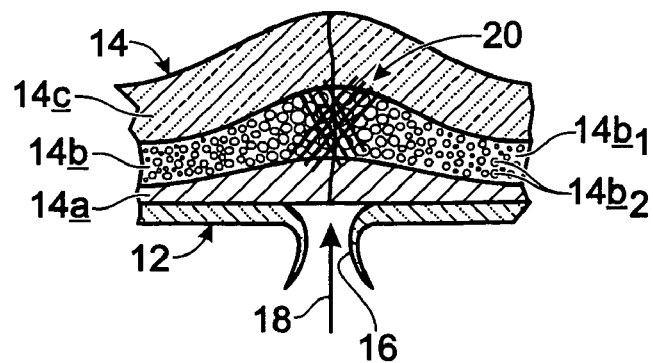
FIG. 4 is a still further enlarged cross-sectional view of the region in FIG. 3 which is bracketed by curved arrows 4—4.

Coating 14, in its preferred embodiment, and which is best pictured in FIGS. 2–4, inclusive, includes three unified layers, or layer structures, 14a, 14b, 14c.

Layer 14a, which is also referred to herein (a) as a first-type barrier layer structure, (b) as a bonding layer, and (c) as a leakage-responsive substructure, has a preferable thickness (see $t_1$ in FIG. 3) of about ⅛-inches. This layer is directly joined (bonded) to the outside surface of tank 12, and is formed of a suitable high-elasticity, high-tensile-strength, high-tear-resistance elastomer. A very suitable material for layer 14a is a two-component polyurethane elastomer product called TUFF STUFF.® FR (with the letters FR standing for fire-resistant), made by Rhino Linings USA, Inc.—a company based in San Diego, Calif. This material is applied, as will later herein be described, by spraying it onto the outside surface of tank 12. It exhibits an elasticity which permits an elastic elongation before "breakage" of about 400%, has a tensile strength of about 1700–1900-psi, and possesses a tear resistance of about 140–150-pli. The material forming this layer reacts modestly, and over a relatively long time period, to contact with hydrocarbon fuel, imbibing such fuel, and swelling in the process. In the preferred embodiment of the invention which is now being described, this "modest" reaction time period extends to up to about 20-minutes relative to a puncture wound.

Layer 14b, which is also referred to herein (a) as a second-type barrier layer structure, (b) as an expansion layer, and (c) as a leakage responsive substructure, has a preferable thickness (see $t_2$ in FIG. 3) lying within the range of about ⅛-to about 3/16-inches. This layer is formed as a special composite structure which includes an elastomeric expanse portion $14b_1$ (see FIG. 4) formed of the same material used in layer 14a, in which expanse is entrained what is called herein a reaction substance which takes the form of a distribution of small liquid-imbiber beads $14b_2$ (see FIG. 4). These beads, also referred herein as elemental components, have a strong affinity for rapidly fully absorbing (imbibing) various liquids, such as hydrocarbon fuel, and they swell significantly in volume as a consequence. Rapid full imbibing typically occurs in under about a half-minute. A very suitable imbiber-bead material is the product known as IMB230300 made by Imbibitive Technologies America, Inc. in Midland, Mich. These beads preferably are blended in any appropriate manner into the entraining elastomer material to constitute about 20% by weight in the combined material. This combined material for layer 14b is then applied to layer 14a by spraying to achieve the desired thickness mentioned above. While the weight percentage of entrained beads is preferably at the 20% level, a suitable range lies between about 15% and about 25%.

Composite layer 14b is characterized by possessing an elasticity which permits an elastic elongation (before breakage) of about 67%, a tensile strength of about 483-psi, and a tear resistance of about 115-pli.

Layer 14c, which is also referred to herein as a compression layer, has a thickness (see $t_3$ in FIG. 3) of about ¼-to about ⅜-inches. It is made of the same material used in layer 14a, and is also spray-formed to the desired thickness on the outside of layer 14b. After application and "curing" of this layer, a certain level of tension exists in this layer. This tension, coupled with the mentioned relatively large thickness, significantly contributes to the ability of layer 14c to produce enhanced sealing compression of underlying layer material in the region of a puncture wound.

Thus, and as one will note, the three layers which make up coating 14 are preferably differentiated in thickness, progressing outwardly from tank 12 with increasing thicknesses.

While the exact manner of preparing and applying the various layers that make up coating 14 will vary from application to application, as for example depending upon the nature of the container material to which the coating is to be applied, those skilled in the art will understand, from the description which is now to follow of one manner of preparing coating 14, how variations may be implemented to suit such other applications. The application process now to be described relates to applying coating 14 to the outside surface of the steel fuel tank in military vehicle 10.

With respect to use of the two foundation materials that make up layers 14a, 14b and 14c—namely the mentioned elastomeric material and the mentioned imbiber bead material—it is important that the surface of the fuel tank be appropriately prepared so that inner layer 14a will bond and adhere suitably to the tank. The tank may be prepared with an appropriate primer, to a thickness of about 3- to about 5-mils, with this primer coating initially presenting a light shine, and entering a curing period of about 45- to about 60-minutes. After the curing period, this primer coating will be dry, but will possess a slight tack surface.

With respect now to creating the various layers of coating 14, taking the materials which have been described above herein as being preferred materials to employ, we have found that it is best to apply these materials (in a manner which will now be described) through orthogonally associated alternate groups of successive, overlapping, substantially parallel, linear spraying passes, all performed at an applied-material temperature of about 65- to about 80-degrees Fahrenheit, and in an ambient air temperature of about 70-degrees Fahrenheit, with a relative humidity of about 50-percent or less. We have determined that the very best ambient temperature and relative humidity conditions are those wherein these is an absolute value difference between them is about ten (10) or greater.

Inner layer 14a is first applied simply by appropriate, alternate groups of such successive spray passes utilizing the mentioned elastomeric material. A first round (group) of substantially parallel, linear spray passes may be suitably overlapping lateral left-to-right and right-to-left, followed by a series of laterally overlapping up-to-down and down-to-up vertical passes, and so forth, until the desired inner layer thickness is achieved.

Composite layer 14b is then applied by suitably blending the same elastomeric material which has been used in layer 14a with imbiber beads which become entrained in the elastomeric material by the preferred weight contribution mentioned above. Here, also, layer application is accomplished by successive, alternate groups of horizontal and vertical overlapping spray passes until the desired thickness attained.

Finally, outer layer 14c is applied via substantially the same horizontal and vertical overlapping spray activities until the desired outer layer thickness develops.

It will be clear to those skilled in the art that variations of layer thicknesses and/or container surface preparations may be selected for different specific applications.

FIGS. 2–4, inclusive, illustrate that a bullet has penetrated the three layers in coating 14, and has punctured tank 12 to produce a penetration, or puncture, wound 16 in the wall of the tank.

Almost instantly after the bullet strike, and the resulting penetration, layers 14a, 14b, 14c, "re-close" upon themselves elastomerically to initiate a fluid seal directly over the tank puncture wound. This is clearly illustrated in FIG. 3, and it comes about especially because of the high intrinsic elasticity in layers 14a and 14c, and in the elastomeric expanse portion $14b_1$ in layer 14b.

Fuel begins to leak through wound 16, as indicated by arrow 18 in FIG. 3, and in the process of leaking comes into contact with the materials present in layers 14a, 14b, 14c. It turns out, as mentioned earlier, that both of the foundation materials which are employed variously in layers 14a, 14b, 14c respond with fuel-imbibing and volumetric-swelling reactions in relation to contact with fuel leaking from tank 12. The composite structure in layer 14b exhibits a significantly greater volumetric swelling rate than that exhibited by the elastomer material alone in layers 14a, 14c. This cooperative and collaborative swelling, combined with the enhanced compression-producing tension which is present especially in compression layer 14c, creates significant sealing pressure within coating 14 in the important region immediately outside of and around puncture wound 16. This condition is illustrated quite clearly in FIG. 4.

Additionally, and very importantly, leakage fuel and the material in beads $14b_2$ react chemically and cooperatively to congeal and form a tacky and sticky coagulant mass, pictured at 20 in dark, central, cross-hatch lines in FIG. 4. This coagulant mass effectively provides a positive blockage (in the form of a sealing continuum across the path of the puncture wound) to any continued fuel leakage.

The rapid response associated with the behavior of beads $14b_2$ causes major fuel leakage to become inconsequential within under about one to five minutes. Substantially all leakage is normally stopped after the elapse of about 20-minutes, owing to the more modest, time-extended response nature of the elastomer material in coating 14. During this longer time period, elastomer in layer 14b effectively brings a large lateral number of the imbiber beads into the invention's sealing action.

Figure 5:
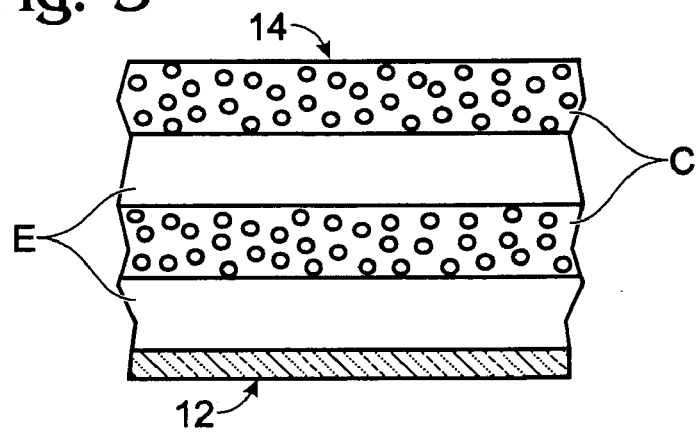
FIGS. 5 and 6, illustrate two different modifications of the layer barrier coating pictured in FIGS. 2–4, inclusive.
Figure 6:
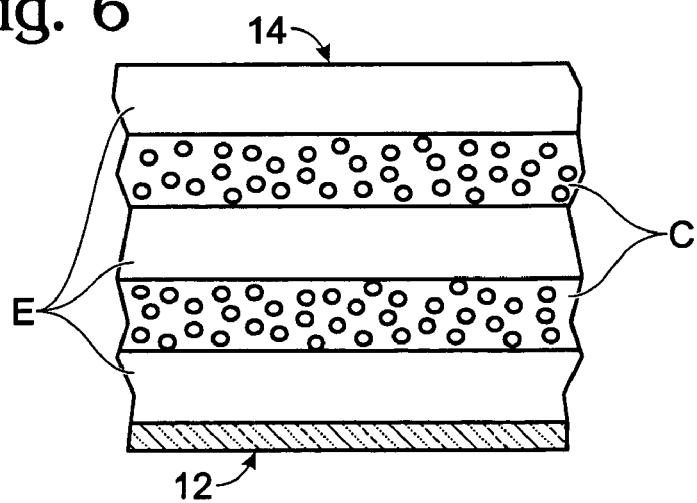

Turning attention now to FIGS. 5 and 6 in the drawings, these two figures illustrates each an alternative embodiment of the present invention. Material layers in these two figures are labeled either E for elastomer, or C for combination (composite). The E layers are like layers 14a, 14c in FIGS. 2–4, inclusive. Layers C are like layer 14b. These E and C layers are not illustrated in exact thickness-scale relative to one another.

The invention thus proposes a unique plural-layer coating (in preferred and various alternative forms) for rapidly sealing, against liquid leakage, a puncture wound in the wall of a liquid container. Following the occurrence of such a wound, the coating of the invention responds effectively with both rapid and longer-term sealing actions involving (a) an elastomeric puncture-path, pressure-closure response, (b) a leakage-liquid-imbibing and swelling response, aided by elastomeric response (such as tension in the compression coating layer), to apply sealing pressure which is effective to close a puncture wound, and (c) a coagulation response to create a leakage-blocking coagulant mass which forms a blockage continuum across the path of a puncture wound.

While a preferred embodiment and methodologic practice of the invention have been described and illustrated herein, and several modifications described, it is appreciated that other variations and modifications may be made without departing from the sprit of the invention.

We claim:

1. Barrier structure placeable as a projectile disabling, anti-fuel-leak protective coating adjacent a vulnerable outside surface in a container designed to hold defined liquid of a certain nature, said structure comprising
    first-type barrier layer structure formed as a sheet-like expanse of an elastomeric material which is capable of imbibing such defined liquid and of swelling in the process of so imbibing such liquid, and which is substantially fully self-healing through elastomeric behavior, as well as through liquid imbibing and resultant swelling, with regard to a container-piercing projectile wound, and
    second-type barrier layer structure operatively disposed adjacent one side of said first-type barrier layer structure, and composite in nature, said second-type barrier layer structure having elemental components which are entrained in another sheet-like expanse of the same elastomeric material employed in said first-type barrier layer structure, and wherein said entrained components function as imbibers of the mentioned defined liquid, and expand, three-dimensionally, in relation to any direct contact with the mentioned defined liquid.

2. The barrier structure of claim 1, wherein said elemental components are additionally structured to form, cooperatively with any contacting leakage liquid, a leakage-flow-inhibiting coagulant.

3. The barrier structure of claim 1 which further comprises a third-type barrier layer structure formed with the same elastomeric material employed in said first-type barrier layer structure, and which is operatively disposed adjacent the opposite side of said second-type barrier layer structure relative to the location of said first-type barrier layer structure.

4. The barrier structure of claim 3, wherein one of said layer structures which is formed of the mentioned elastomeric material is disposed against the outside surface of the mentioned container.

5. The barrier structure of claim 4, wherein the mentioned three layer structures have different thicknesses, with the thinnest layer structure being the one which is directly adjacent the container's outside surface, the next thickest one being the one containing said elemental components, and the thickest one being the third-type barrier layer structure.

6. The barrier structure of claim 1, wherein the defined liquid is hydrocarbon fuel.

* * * * *